US006868222B2

(12) United States Patent
DePue et al.

(10) Patent No.: US 6,868,222 B2
(45) Date of Patent: Mar. 15, 2005

(54) OPTICAL ATTENUATOR USING A PERTURBATION ELEMENT WITH A MULTI-MODE WAVEGUIDE

(75) Inventors: Marshall Thomas DePue, San Mateo, CA (US); Doug Baney, Los Altos, CA (US); Gary Trott, San Mateo, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 168 days.

(21) Appl. No.: 10/188,390

(22) Filed: Jul. 1, 2002

(65) Prior Publication Data

US 2004/0001687 A1 Jan. 1, 2004

(51) Int. Cl.[7] .............................. G02B 6/12; G02B 6/00; G02B 6/14
(52) U.S. Cl. ..................... 385/140; 385/14; 385/28; 385/43
(58) Field of Search ............................... 385/15, 27–29, 385/39, 40, 43, 140, 14

(56) References Cited

U.S. PATENT DOCUMENTS

| | | | |
|---|---|---|---|
| 5,790,720 A | | 8/1998 | Marcuse et al. |
| 5,796,906 A | * | 8/1998 | Narayanan et al. ............ 385/15 |
| 5,841,913 A | * | 11/1998 | Marcuse et al. ............... 385/28 |
| 6,445,843 B1 | * | 9/2002 | Duer ............................ 385/17 |
| 6,546,163 B2 | * | 4/2003 | Thackara ...................... 385/18 |
| 2002/0018636 A1 | * | 2/2002 | Bischel et al. ............... 385/140 |
| 2003/0012483 A1 | * | 1/2003 | Ticknor et al. ................ 385/16 |

FOREIGN PATENT DOCUMENTS

| | | |
|---|---|---|
| CA | 2306325 | 10/2000 |
| JP | 11160634 | 6/1999 |
| JP | 2001183710 | 7/2001 |

OTHER PUBLICATIONS

Leuthold, J. et al, "Multimode Interference Couplers with Tunable Power Splitting Ratios", Journal of Lightwave Technology, IEEE, New York, vol. 19, No. 5, May 2001, pp. 700–707.

Bosc, D., "Thermo–Optical Coefficient Determination of Index Liquids used for Optimization of Optical Integrated Components", Optics Communications, vol. 194, No. 4–6, Jul. 15, 2001, p. 353–357.

Bessem P.A. et al. "The Integrated Prism Interpretation of Multileg Mach–Zehnder Interferometers based on Multi-mode Intererence COuplers", Optical and Quantum Electronics, vol. 27, No. 10, 1995, pp. 909–920.

Yagi, M. et al., "Versatile Multimode Interference Photonic Switches with Partial Index–Modulation Regions", Electronics Letters, vol. 36, No. 6, Mar. 16, 2000, pp. 533–534.

Leuthold, J. et al. "Multimode Interference Couplers for the Conversion and Combining of Zero– and First–Order Modes", Journal of Lightwave Technology, IEEE, New York, vol. 16, No. 7, Jul. 1998, pp. 1228–1238.

* cited by examiner

*Primary Examiner*—Akm Enayat Ullah
*Assistant Examiner*—Omar Rojas

(57) ABSTRACT

An optical attenuator having a multi-mode waveguide segment and a perturbation element. An incident single-mode optical signal is converted to a multi-mode optical signal in the multi-mode waveguide segment. The optical attenuator couples incident light into higher order modes of the multi-mode waveguide segment resulting in attenuation of the incident optical signal.

20 Claims, 7 Drawing Sheets

OPTICAL ATTENUATOR USING A PERTURBATION ELEMENT WITH A MULTI-MODE WAVEGUIDE

TECHNICAL FIELD

Embodiments of the present invention relate to the field of optical circuits. More specifically, embodiments of the present invention relate to optical attenuators.

BACKGROUND ART

A class of optical circuits includes circuits known as planar lightwave circuits (PLCs). In such circuits, optical signals received from input terminals are selected, redirected and transmitted to output terminals. Often, the redirection is performed using an array of switches.

In fully optical circuits, optical signals are carried along waveguides. Waveguides are typically formed as a doped core region situated within a substrate. The doped core region and the surrounding substrate generally have different refractive indexes. An optical signal is guided through the substrate along the waveguide. Perturbations may be formed within or along the waveguide to perform switching operations on the optical signals traveling in the waveguide, for example. Typically, the waveguides are laid out as a grid having intersections, or cross points, and the perturbations are formed at the intersections.

A perturbation can be a liquid-filled trench used as an optical switch, a doped portion of the waveguide, or some other structure or material having a refractive index different than the refractive index of the waveguide. The refractive index of a switching perturbation is capable of being changed between a number of possible states, for instance, between two levels. One of the levels causes the optical signals to pass through the perturbation without changing direction, and the other level causes the optical signals to change direction and pass into an intersecting waveguide. In the case of a liquid-filled trench, the liquid may be moved aside in some manner to leave a gaseous phase at the intersection; for example, a bubble may be formed in the trench by heating the liquid. In general, the perturbation defines a three-dimensional index of refraction distribution, positioned at an intersection of two waveguides; changing the value of the refractive index performs a switching operation.

Figure 1:
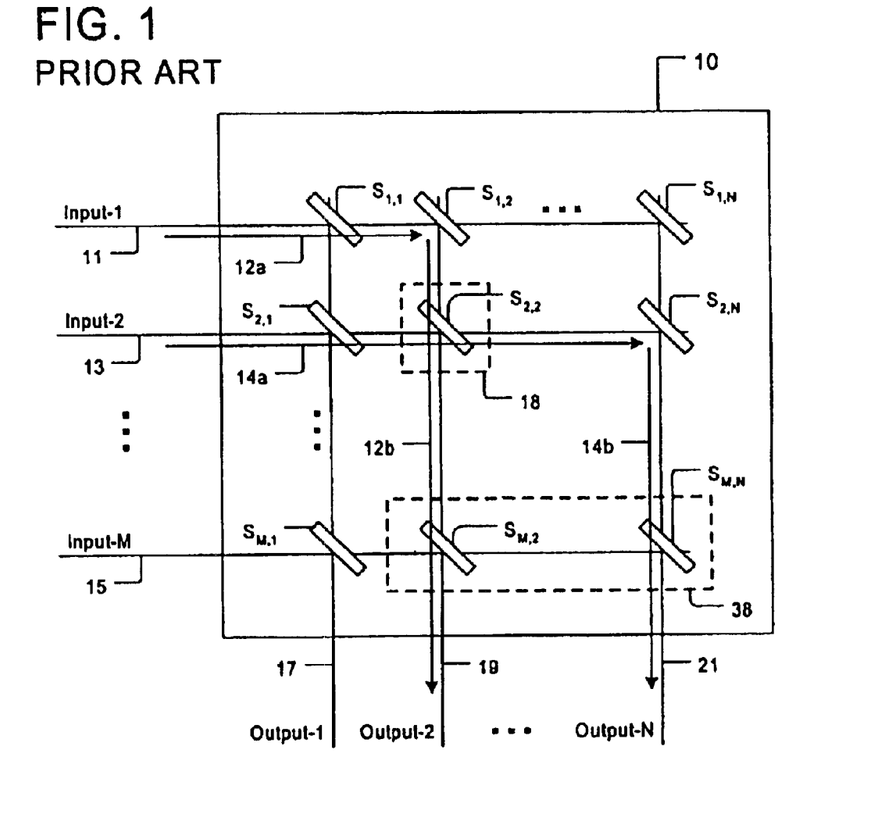
FIG. 1 illustrates a prior art optical switching device.

Prior Art FIG. 1 illustrates an exemplary switching device 10 that is able to switch M input optical paths (designated Input-1 11, Input-2 13, ..., Input-M 15) into N output optical paths (designated Output-1 17, Output-2 19, ..., Output-N 21). The input and output paths can be waveguide segments; however, although described herein as such, in general the optical paths can be any optical path capable of conducting an optical signal. Device 10 includes optical switches (designated $S_{i,j}$, where i is the input row and j is the output column) at each waveguide intersection. Prior Art FIG. 1 illustrates two of the possible optical paths through device 10. The first path, designated by vectors 12a and 12b, shows an input signal Input-1 11 directed via switch $S_{1,2}$ to the output terminal Output-2 19. The second path, designated by vectors 14a and 14b, shows an input signal Input-2 directed via switch $S_{2,N}$ to the output terminal Output-N 21.

Figure 2:
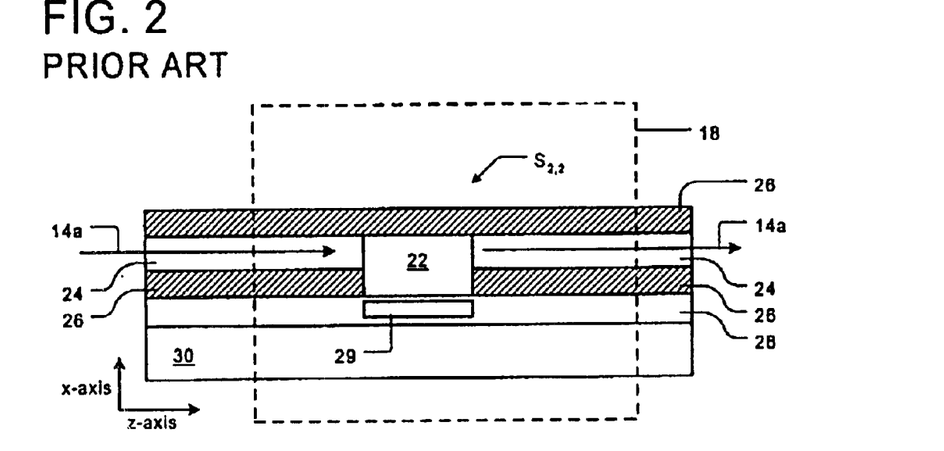
FIG. 2 illustrates a portion of the prior art switching device of FIG. 1.

Prior Art FIG. 2 illustrates a view of section 18 of device 10. Section 18 includes a fluid optical switch $S_{2,2}$ having a trench 22. Switch $S_{2,2}$ is defined by trench 22 formed between a break in waveguide 24 and other layers of device 10 including, without limitation, cladding layers 26 and heating circuit layer 28, including heating element 29. The layers of device 10 are typically built on a substrate 30. Such switches are known in the art.

A variation in optical power within an optical circuit may cause deleterious effects, including detector saturation and inter-channel cross-talk, that can lead to transmission errors. Because power fluctuations occur dynamically within an optical circuit, it is of interest to have a means of adjustment. This is the function of variable optical attenuators (VOAs).

The VOAs of the prior art each have their disadvantages. Prior art VOAs may be too large, too expensive, or require too much power. Prior art VOAs may also have a slow response or a high insertion loss. In addition, prior art VOAs may not be readily integrated with optical circuits and switches such as those described above. Accordingly, there is a continuing need for VOAs that provide an improvement over the disadvantages of the prior art.

DISCLOSURE OF THE INVENTION

Embodiments of the present invention pertain to an optical attenuator having a multi-mode waveguide segment and a perturbation element. An incident single-mode optical signal is converted to a multi-mode optical signal in the multi-mode waveguide segment. The optical attenuator couples incident light into higher order modes of the multi-mode waveguide segment resulting in attenuation of the incident optical signal.

BRIEF DESCRIPTION OF THE DRAWINGS

The accompanying drawings, which are incorporated in and form a part of this specification, illustrate embodiments of the invention and, together with the description, serve to explain the principles of the invention. The drawings referred to in this description should not be understood as being drawn to scale except if specifically noted.

PRIOR ART

PRIOR ART

DETAILED DESCRIPTION OF THE INVENTION

Reference will now be made in detail to the various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. In other instances, well known methods, procedures, components, and circuits have not been described in detail as not to unnecessarily obscure aspects of the present invention.

Embodiments of the present invention pertain to optical attenuators that can be readily integrated into planar lightwave circuits (PLCs) including contemporary silica-based PLCs and in particular silica-based PLCs that match (mate) with single-mode fibers. In general, the optical attenuators of the present invention function to attenuate an aspect (e.g., power) of an optical signal transmitted using an optical waveguide.

An optical waveguide can transmit optical signals, or light, in both guided and unguided modes. In the guided mode, light propagates down a waveguide via total internal reflection and has a substantial fraction of its power confined within the waveguide. In the unguided mode, power is lost as light propagates away from the guiding layer; the unguided light does not propagate a significant distance along its direction of travel.

In designing a system with guided wave optics, it may be desirable to use only the lowest order guided mode present. The lowest order guided mode has the largest fraction of the power of the optical signal localized within the waveguide core. This can minimize dispersion and loss associated with the presence of higher order modes. The feasibility of such single mode structures has been demonstrated.

If light traveling within a waveguide is confined to a particular guided mode, it remains in that mode as long as it is traveling in a perturbation-free environment. In many optical devices, including a variety of PLCs such as optical switches, structures such as trenches are often used at the intersection, or cross point, of two waveguides to perform a switching operation in an optical switch. Such a structure introduces a perturbation in the path of the optical signal. Perturbations can create a variation in the dielectric constant in the region of the perturbation. On encountering a variation in the dielectric constant, the optical signal behaves differently.

Light propagating near a dielectric perturbation can be thought of as being comprised of a number of modes. A description of the light at a dielectric perturbation includes a sum over all of the possible modes including a finite number of possible guided modes and an infinite number of radiation, or continuum, modes. Dielectric constants, geometry, and symmetry of the perturbation determine which modes are present as well as their relative proportions. Consequently, a perturbation in the dielectric constant can couple modes and allow an exchange of energy from one mode to higher order modes.

A perturbation can cause an optical signal to lose some of its power due to diffraction and radiation. Mode conversion and coupling can be a source of loss. Radiation modes excited near an obstacle such as a trench or other type of perturbation may not be re-trapped and guided into the waveguide on the other side of the perturbation, thereby losing power. The magnitude of such a loss depends on the nature of the dielectric perturbation, $\Delta\epsilon$, which in turn depends on the refractive index distribution, $\Delta n$, as well as the geometry and symmetry of the structure. In accordance with the various embodiments of the present invention, perturbations in the dielectric constant are designed that can attenuate optical signals and minimize insertion loss.

Figure 3:
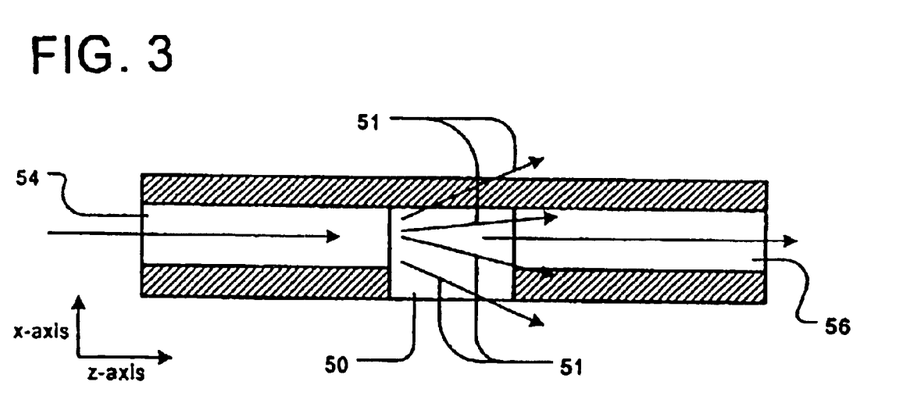
FIG. 3 illustrates a model of a perturbation acting on an optical signal in accordance with one embodiment of the present invention.

In general, light traversing a perturbation 50 (illustrated as a trench 50) in FIG. 3 will diffract and scatter from the obstacle as shown by vectors 51. Light originating from the input waveguide 54 that scatters from the perturbation may not lie within the numerical aperture of output waveguide 56, thus realizing optical loss. Optical loss may also occur from diffraction; the spreading out of the light as it crosses trench 50 leads to a larger size, and thus poorly mode-matched, beam of light at the output waveguide 56. Excitation of higher order "leaky" modes can lead to additional optical loss. The trench refractive index distribution, geometry, and symmetry can be optimized to prevent the excitation of these higher order modes.

Figure 4:
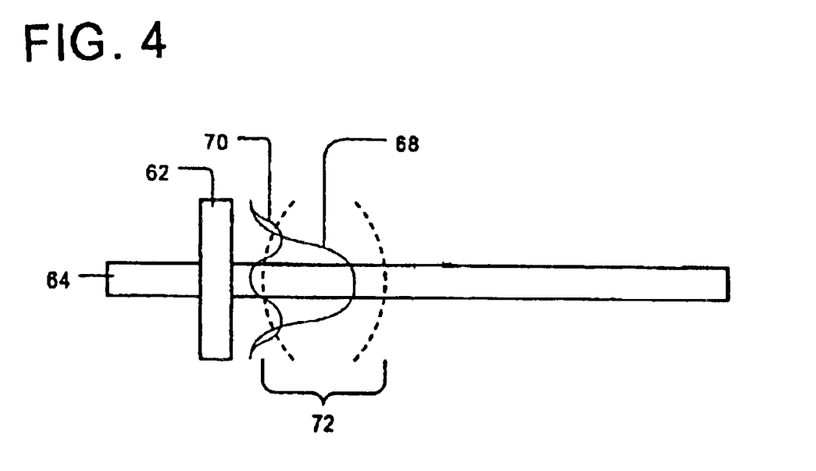
FIG. 4 illustrates a perturbation across a waveguide according to one embodiment of the present invention.

FIG. 4 illustrates a perturbation 62 across a waveguide 64 according to one embodiment of the present invention. For the perturbation 62 illustrated in FIG. 4, the dominant mode component 68 and the higher-order mode components 70 of the optical signal combine in superposition to form a wavefront 72. The trench geometry and refractive index distribution are selected so that the phases and amplitudes of the dominant mode and any higher order modes excited by the perturbation 62 are adjusted appropriately to allow recapture within the coupling length of the output waveguide.

In general, mode coupling is a more complicated function depending on the propagation constants of the excited modes as well as the geometry and refractive index distribution of the perturbation. Additionally, a waveguide perturbation can lead to the excitation of lossy higher order modes. This is the physical mechanism for attenuation.

Suppose, for example, that light is incident on a dielectric perturbation such as a trench. The representation of the light near the trench is a sum over an infinite number of modes as follows:

$$E(x, z, t) = \sum_j \{a_j^{+\hat{z}}(z)E_y^j(x)e^{-i(\beta_j z - \omega t)} + a_j^{-\hat{z}}(z)E_y^j(x)e^{i(\beta_j z + \omega t)}\} + \quad (1)$$

$$\int d\beta a(\beta, z)E_\beta(x)e^{-i(\beta z - \omega t)} + c.c.$$

Note that symbols used herein but not specifically described have the usual and conventional meaning within the art.

The coefficients $a_j(z)$ in equation (1) determine how much of each mode is present and are themselves determined by the specific details of the perturbation. That these coefficients depend on distance illustrates how different mixtures of modes can exist as a function of position along the waveguide. The coefficients $a_j^{+\hat{z}}(z)$ represent waves traveling in the original propagation direction, while the $a_j^{-\hat{z}}(z)$ are reflected waves generated by the obstacle. There are two types of modes present in the formula: guided modes and radiation modes. The discrete sum includes guided modes while the integral is a sum over the infinite number of radiation modes. Thus, a careful through-loss optimization focuses on understanding the continuum of radiation modes and learning how to subtly adjust their phases and decay lengths to ensure optimal re-coupling.

For clarity of exposition, and without loss of generality, it is possible to drop the radiation modes from equation (1) (for example, by employing a suitable and well-known discretization procedure) and consider the electric field as a sum of discrete modes only. By assuming that amplitudes vary slowly with position (slowly varying amplitude approximation) and by using the orthogonality property of the transverse electric modes, a differential equation—the so-called coupled mode equation—is derived for the amplitudes:

$$e^{i(\beta_j z+\omega t)}\frac{\partial a_j^{-z}}{\partial z} - e^{-i(\beta_j z-\omega t)}\frac{\partial a_j^{+z}}{\partial z} = \qquad (2)$$

$$-\frac{i}{2\omega}\frac{\partial}{\partial t^2}\int_{-\infty}^{+\infty} dx E_y^j(x, z, t) P_{Pert}(x, t).$$

where $P_{pert}$ represents the interaction of incident light with a perturbed dielectric constant.

Equation (2) shows that the coupling into mode j depends on the overlap integral of the mode j multiplied by the perturbation. If the incident light is contained in mode m, then:

$$E_y^m(x,z,t) = a_m^{+z}(z) E_y^m(x) e^{-i(\beta_m z - \alpha x)},$$

and thus the perturbation takes the form:

$$P_{Pert}(x, z, t) = \Delta\varepsilon(x, z) \cdot E_y^m(x, z, t) \qquad (3)$$

$$= \Delta\varepsilon(x, z) a_m^{+z}(z) E_y^m(x) e^{-i(\beta_m z - \omega t)}.$$

The perturbation is seen to couple mode m into mode j via the overlap integral.

Several interesting features can be derived from equation (3). First, in the limit of a very weak perturbation, $P_{Pert}(x, z, t) \approx 0$, there is no coupling between modes. Instances of no coupling can occur when the overlap integral vanishes, such as in special occasions where the perturbation has a high degree of symmetry. For example, a symmetric notch in a slab waveguide can only couple the lowest order mode to a higher order mode with even symmetry. Another result found by analyzing the overlap integral is that power can oscillate back and forth between modes as a function of the length of the obstacle. The coupling in this case is often enhanced when the perturbation makes up the difference, $\Delta\beta$, between the propagation constants of the modes in question. In practice this occurs when the length L of the perturbation is of order $\Delta\beta \approx \text{const}/L$. In a similar fashion, a periodic perturbation, with spacing $\Lambda$, can couple modes. In this case, a particular spatial Fourier component of the perturbation causes coupling when $\Delta\beta \approx 1/\Lambda$. Mode coupling via the spacing of the perturbations may contribute to optical loss.

Figure 5A:
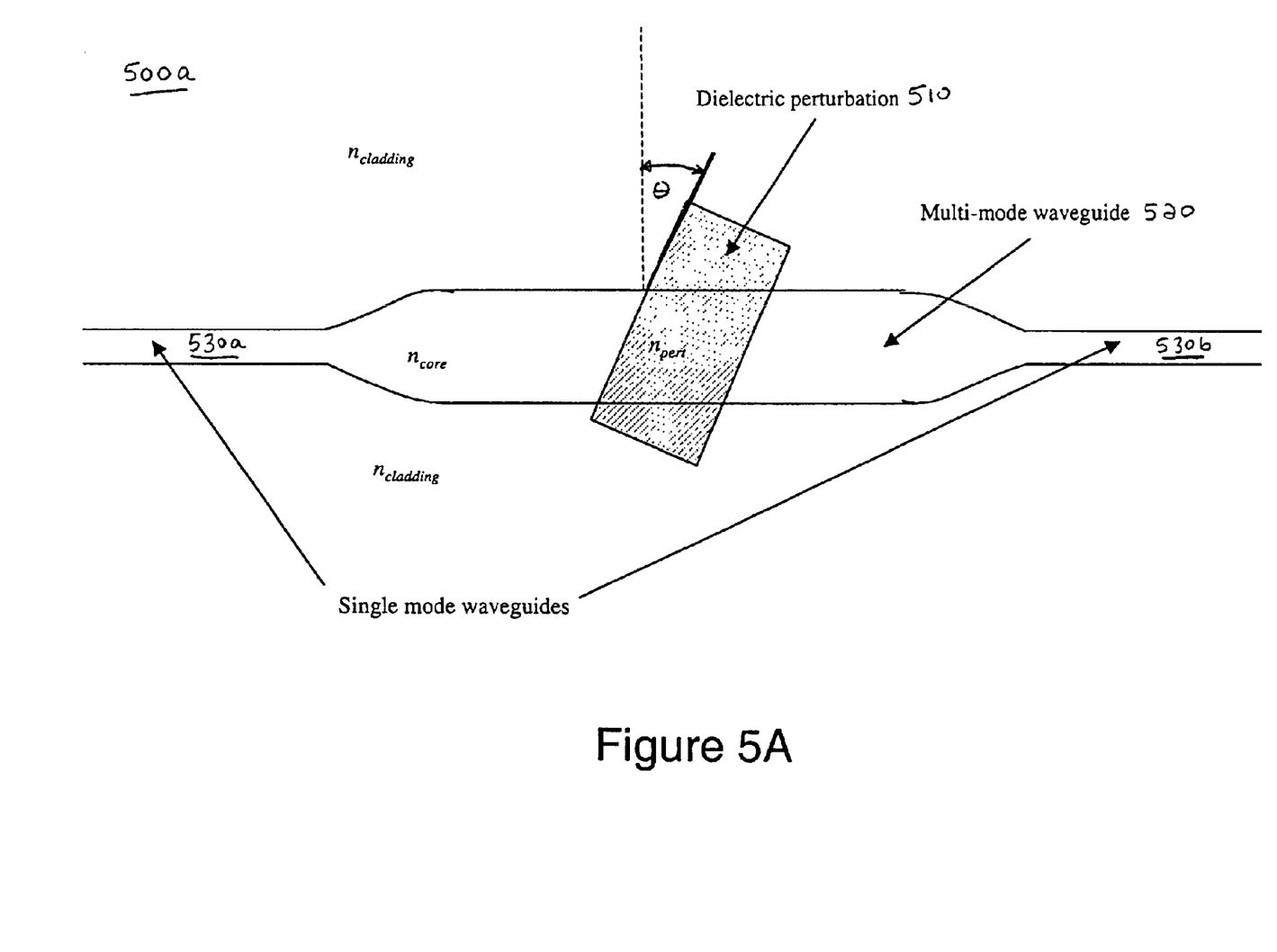
FIGS. 5A, 5B and 5C illustrate embodiments of an optical attenuator according to embodiments of the present invention.

FIG. 5A illustrates one embodiment of an optical attenuator 500a according to the present invention. In general, an optical attenuator functions to attenuate an aspect (e.g., power) of an optical signal. One use of an optical attenuator, or variable optical attenuator (VOA), is for gain stabilization. An optical amplifier, such as an erbium-doped fiber amplifier (EDFA), operates in saturation with a constant total output power. Thus, if the number of single channel inputs to the amplifier change, an individual output channel can see a rapid variation in power. According to its various embodiments, the present invention can be a real-time means of adjustment of optical power. Another use of a VOA described by the various embodiments of the present invention is to flatten the gain of an amplifier or to provide spectral equalization of a dense wavelength division multiplexing (DWDM) signal. For example, a VOA may be placed on each of the output channels of an arrayed waveguide grating (AWG) demultiplexer to control the amplitude of individual optical channels of differing wavelengths. A VOA as described according to the various embodiments of the present invention can be used for cross-talk reduction in an optical switch. For example, a VOA placed in the off-state arm of an optical switch can be used to remove any stray light leaked from the on-state path. A VOA can also be employed within an optical switch to equalize the insertion loss between different paths.

With reference to FIG. 5A, in the present embodiment, a perturbation 510 is situated across multi-mode waveguide segment 520, such that perturbation 510 is disposed partially outside of multi-mode waveguide segment 520. Multi-mode waveguide segment 520 has a three-dimensional refractive index distribution $n_{core}$, while the surrounding substrate has a refractive index distribution $n_{substrate}$. Typically, perturbation 510 has a refractive index distribution $n_{pert}$ that is different from $n_{core}$. In general, perturbation 510 may be comprised of a number of different materials, with the purpose of effecting a change in the index of refraction of multi-mode waveguide segment 520. In addition to the three-dimensional refractive index distribution, the symmetry of the perturbation is an important consideration in determining the mode coupling.

In one embodiment, perturbation 510 is a dielectric perturbation that includes a liquid-filled trench including (or neighboring) a heater element. In this embodiment, the variation of the liquid's refractive index with temperature is typically on the order of $-10^{-4}/°$ C. Typically, refractive index changes of a few parts in a thousand are sufficient to provide large coupling constants with appropriate engineering of the perturbation. In another embodiment, perturbation 510 includes a hybrid material with the proper electro-optic, thermo-optic or elastic properties, such as a nonlinear optical crystal or polymer.

Multi-mode waveguide segment 520 is coupled between single-mode waveguide segments 530a and 530b. In one embodiment, multi-mode waveguide segment 520 has a larger cross-sectional area (e.g., diameter) than single-mode waveguides 530a and 530b. In this embodiment, the coupling of single-mode waveguide segment 530a to multi-mode segment 520 is essentially adiabatic, resulting in low energy loss between these two segments. Although the input and output paths are described herein as waveguide segments, in general the optical paths can be any optical path capable of conducting an optical signal.

The perturbation 510 forms some angle $\theta$ measurable from a reference. In this case, the reference is a line orthogonal to multi-mode waveguide segment 520. The angle $\theta$ may be any value ranging from zero degrees to 360 degrees. Based on empirical data, a numerical solution or the like, a particular value of $\theta$ can be determined that will provide a desired amount of optical attenuation. Also, the value of $\theta$ can be selected to minimize insertion loss (including back reflection effects) while still achieving a desired amount of attenuation.

Figure 5B:
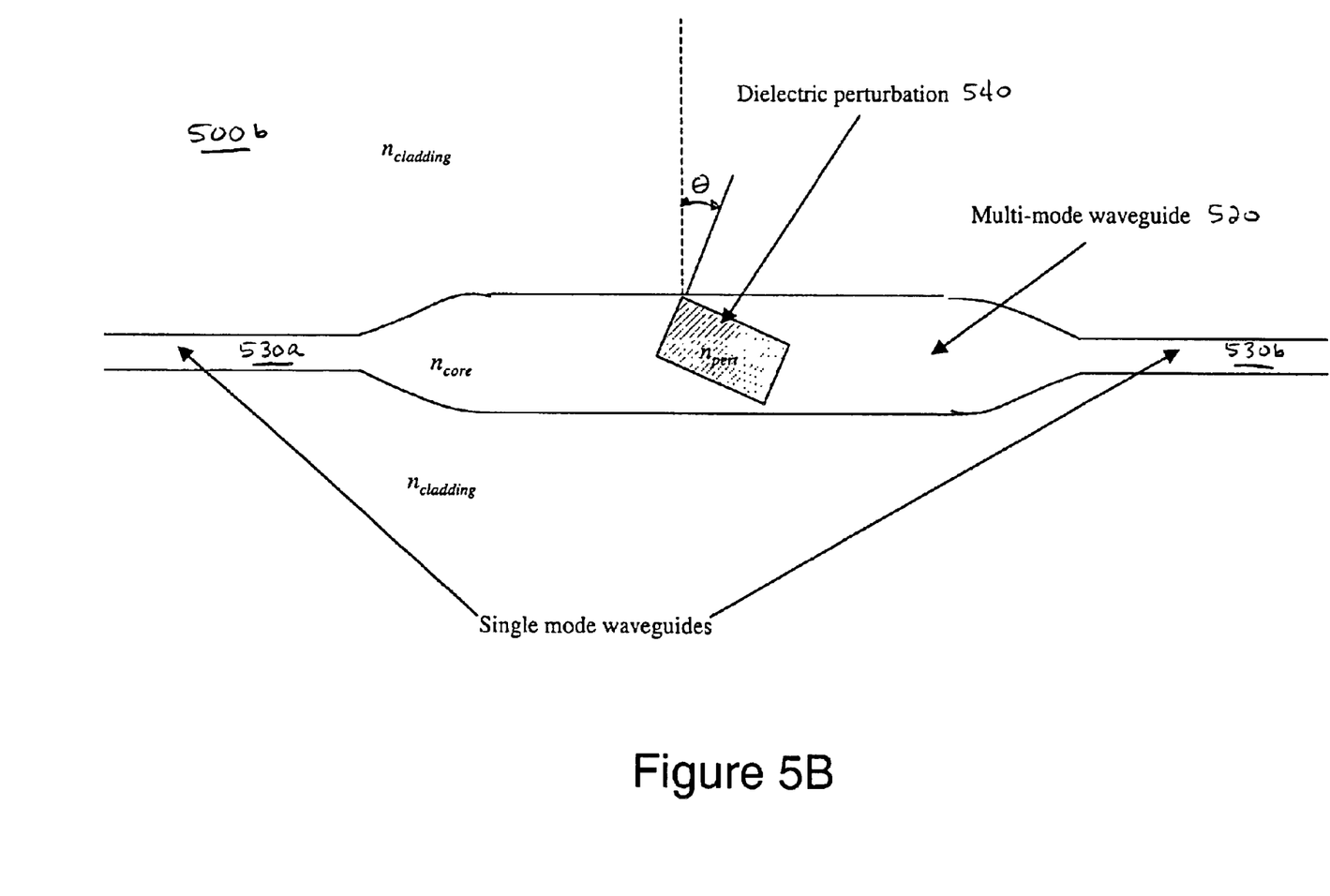
Figure 5C:
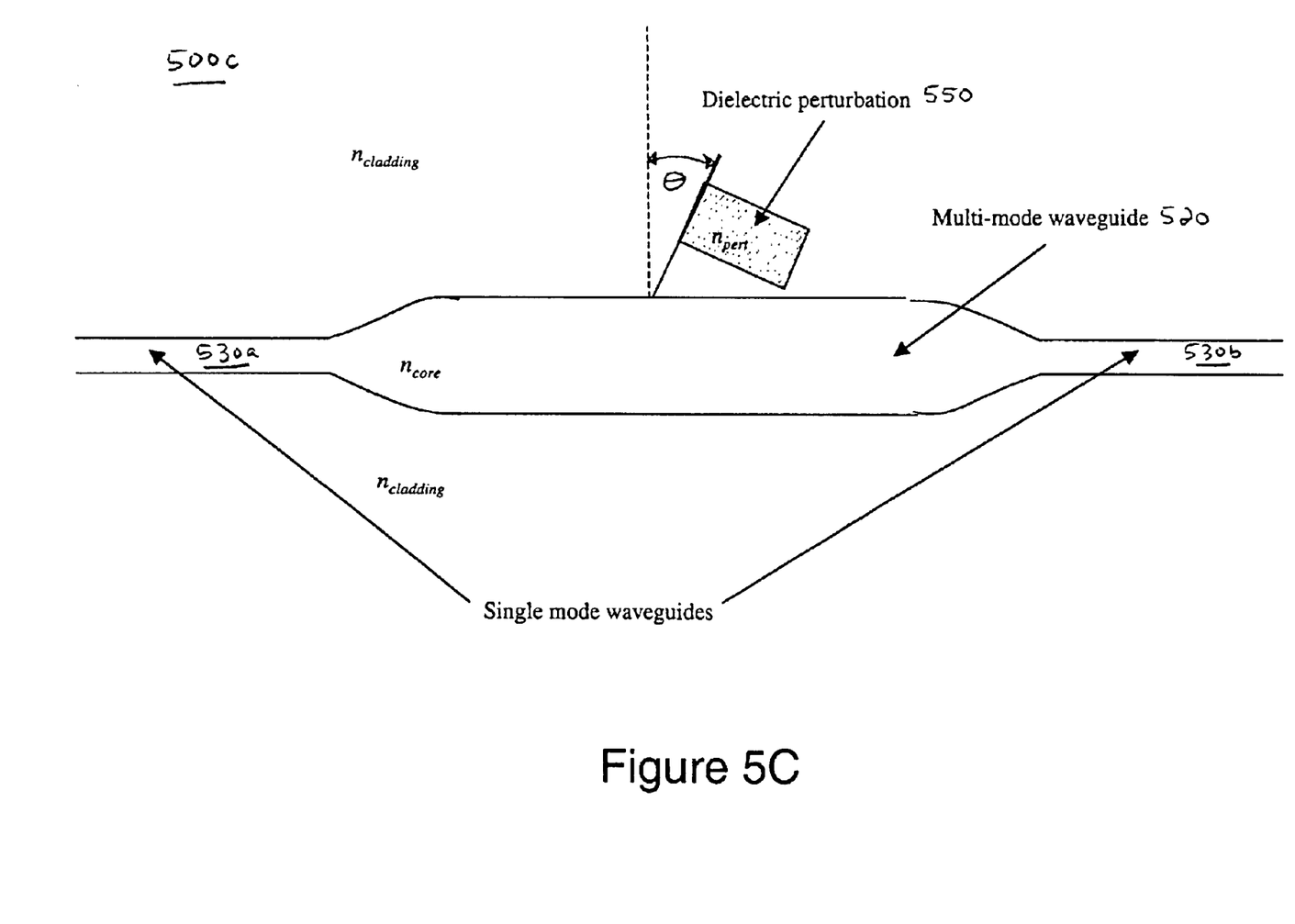

FIGS. 5B and 5C illustrate alternate embodiments of an optical attenuator according to the present invention. Optical attenuator 500b of FIG. 5B shows a perturbation 540 entirely within multi-mode waveguide segment 520. Optical attenuator 500c of FIG. 5C shows a perturbation 550 entirely outside of multi-mode waveguide segment 520. In general, a perturbation (e.g., 500a, 500b, and 500c) may be situated relative to multi-mode waveguide segment 520, in a position to cause perturbation of a multi-mode optical signal being guided along multi-mode waveguide segment 520.

Also, with regard to FIGS. 5A–5C, perturbations 510, 540 and 550 are illustrated as being square or rectangular in shape. However, it is understood that perturbations are not limited to such shapes and that, in the three-dimensional world, perturbations may be shaped in a variety of different ways to achieve a desired amount of optical attenuation, perhaps with consideration also to a desired amount of insertion loss. In addition, the shape of the coupling between the single-mode and multi-mode waveguides, generally illustrated as tapering, may be shaped in different ways depending on a desired amount of optical attenuation and perhaps depending on a desired amount of insertion loss. However, in one embodiment, the coupling of the single-mode waveguide segment 530a to the multi-mode segment 520 is essentially adiabatic, as mentioned above.

Figure 6:
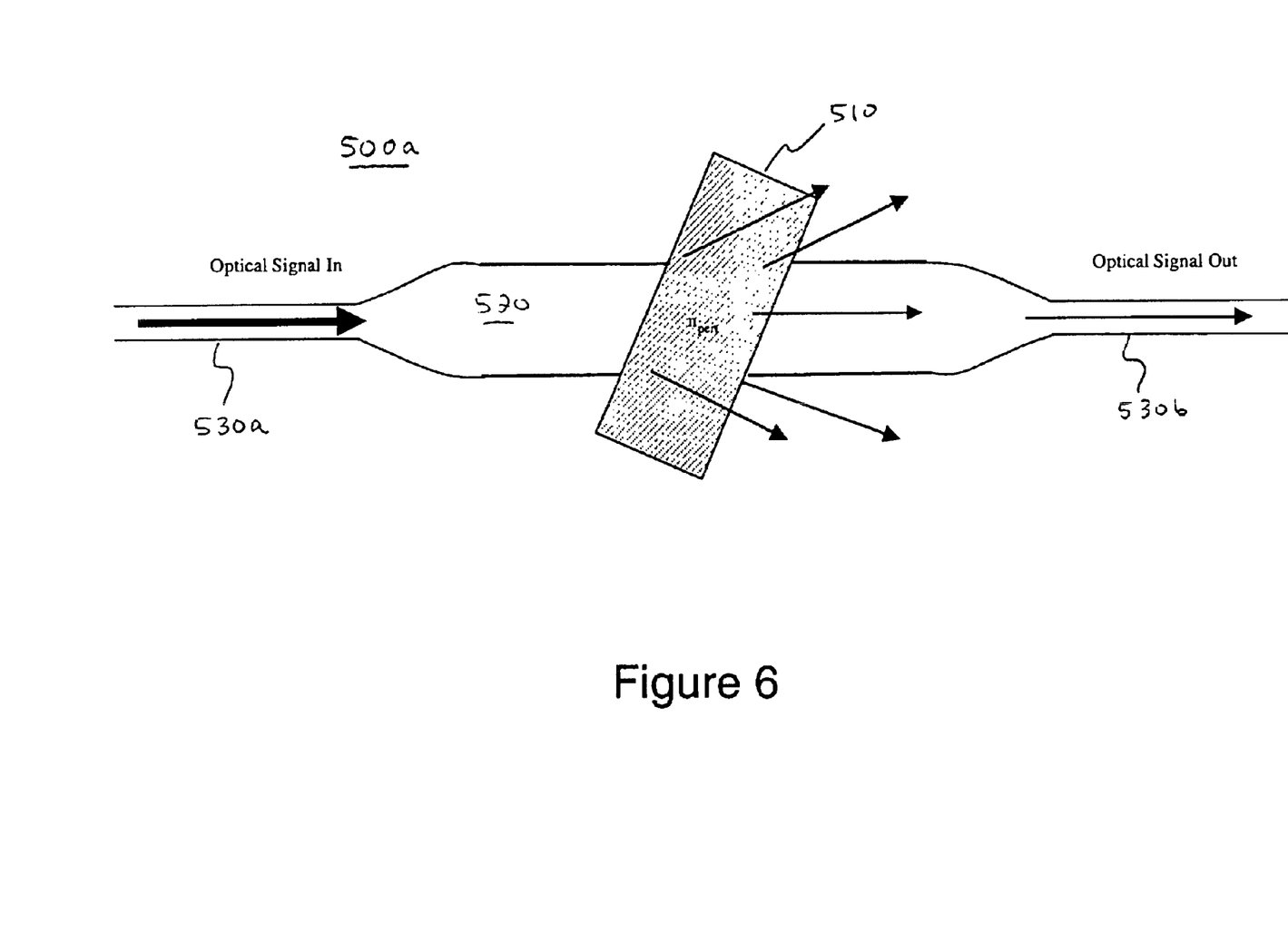
FIG. 6 illustrates an optical attenuator in operation according to one embodiment of the present invention.

FIG. 6 illustrates an optical attenuator 500a in operation according to one embodiment of the present invention. Although described in the context of optical attenuator 500a of FIG. 5A, it is appreciated that the description is also applicable to the optical attenuators embodied by FIGS. 5B and 5C.

With reference to FIG. 6, incident light from single-mode waveguide 530a is coupled into a larger diameter multi-mode waveguide 520. The multi-mode waveguide 520 is engineered to support higher order modes at the operating wavelength. These higher order modes are excited by a suitable (dielectric) perturbation 510. Changing the refractive index distribution of the perturbation 510 couples a variable amount of the incident optical power into the excited modes. Attenuation results from the fact that light in a high order mode does not couple efficiently into the output single-mode waveguide 530b.

As described above, a description of the light at a dielectric perturbation includes a sum over all of the possible modes including a finite number of possible guided modes and an infinite number of radiation, or continuum, modes. Dielectric constants, geometry, and symmetry of the perturbation determine which modes are present as well as their relative proportions. Consequently, a perturbation (e.g., perturbation 510) in the dielectric constant can couple modes and allow an exchange of energy from one mode to higher order modes. Mode conversion and coupling can be a source of loss. Radiation modes excited near an obstacle such as a trench or other type of perturbation may not be re-trapped and guided into the waveguide on the other side of the perturbation, thereby losing power. The magnitude of such a loss depends on the nature of the dielectric perturbation, $\Delta \epsilon$, which in turn depends on the refractive index distribution, $\Delta n$, as well as the geometry and symmetry of the structure. The geometry and refractive index distribution of perturbation 510 can be selected so that the phases of the dominant mode and any higher order modes excited by perturbation 510 are adjusted appropriately to allow recapture within the coupling length of the output waveguide (e.g., single-mode waveguide 530b).

Figure 7:
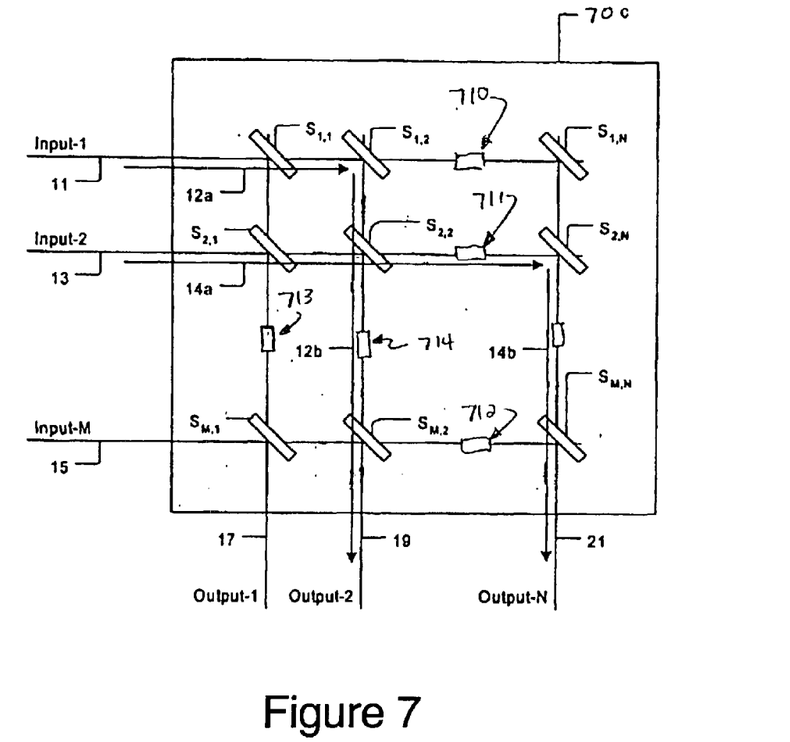
FIG. 7 illustrates an optical device including optical attenuators according to one embodiment of the present invention.

FIG. 7 illustrates an optical device 700 including optical attenuators according to one embodiment of the present invention. In one embodiment, optical device 700 is a planar waveguide circuit (PLC). An advantage of the present invention, in its various embodiments, is that it can be readily integrated within a planar lightwave circuit.

In the present embodiment, optical device 700 includes an array of waveguides including input optical signal paths 11, 13, and 15 (representing inputs 1 to M) and output signal paths 17, 19, and 21 (representing outputs 1 to N) forming a grid of M rows by N columns with M times N intersections, or cross points. The input and output paths can be waveguide segments. While described herein as waveguide segments, the optical paths can be any optical paths capable of conducting an optical signal, for example, optical fiber.

While illustrated as single lines, input waveguides 11, 13, and 15 and output waveguides 17, 19, and 21 typically actually include cores or channels supported by a substrate, cladding, or both, through which light travels. Each waveguide has a three-dimensional refractive index distribution—waveguide refractive index distribution—for guiding light.

To perform a switching function, the optical device 700 includes an array of individual optical switches, one switch located at each intersection and designated $S_{i,j}$, where i is the input path and the j is the output path the switch is connected. The switches are transmissive, in that when filled with an index matching medium, such as a liquid having a refractive index the same as or similar to the refractive index of the waveguide segments (of the input and output paths), the switches allow light traveling in the waveguide to pass directly through. When devoid of the index matching medium, such as when the switch (a trench) is filled with a gas or bubble (for example, upon heating), the incident light is reflected into an adjoining waveguide, instead of being transmitted through the switch. The switches $S_{i,j}$ can be considered active perturbations that operate on the optical signals that are passing through.

While illustrated as a matrix of three (3) rows and three (3) columns for a total of nine optical switch points, the optical device 700 may include any number of input waveguides and output waveguides, having a commensurate number of cross point switches at the intersections thereof. Furthermore, while illustrated as intersecting at right angles, the input waveguides and the output waveguides can intersect at angles other than right angles. For example, the optical device 700 may be an optical switch matrix having a 32-by-32 matrix having 32 input waveguides and 32 output waveguides, or it may be even larger. For simplicity, a 3-by-3 optical switch matrix is illustrated herein. Furthermore, in the present embodiment of optical device 700, each of the input paths (11, 13, and 15) and the output paths (17, 19, and 21) crosses multiple switch elements $S_{i,j}$ at trenches, thus resulting in each input waveguide and each output waveguide being comprised of a plurality of waveguide segments. In use, the waveguide segments can be connected to optical fibers at the inputs and outputs. For example, the input waveguides 11, 13 and 15 and the output waveguides 17, 19 and 21 can be connected to optical fiber ribbon cables using V-groove arrays, the waveguides being typically spaced on the order of 0.25 millimeters apart. Here, the switches $S_{i,j}$ are active perturbations for operating on the optical signal.

In the present embodiment, optical device 700 (e.g., a planar lightwave circuit) includes a number of optical attenuator perturbations exemplified by perturbations 710, 711, 712, 713 and 714. For simplicity of illustration, only these perturbations are illustrated; however, it is appreciated that optical device 700 may include any number of perturbations for optical attenuation. In one embodiment, only a single perturbation is used per waveguide segment for optical attenuation; that is, for example, only a single perturbation 710 may be used between switches $S_{1,2}$ and $S_{1,N}$. In another embodiment, more than one perturbation may be used per waveguide segment.

Perturbations 710–714 are shown as being between the switches $S_{i,j}$; however, under some circumstances, such perturbations may be located at the intersections of waveguides. That is to say, in some instances, the switches $S_{i,j}$ may also be used for optical attenuation. Also, although the perturbations are illustrated as being placed roughly at the midpoint between switches, it is understood that they may be placed at any location between switches.

Figure 8:
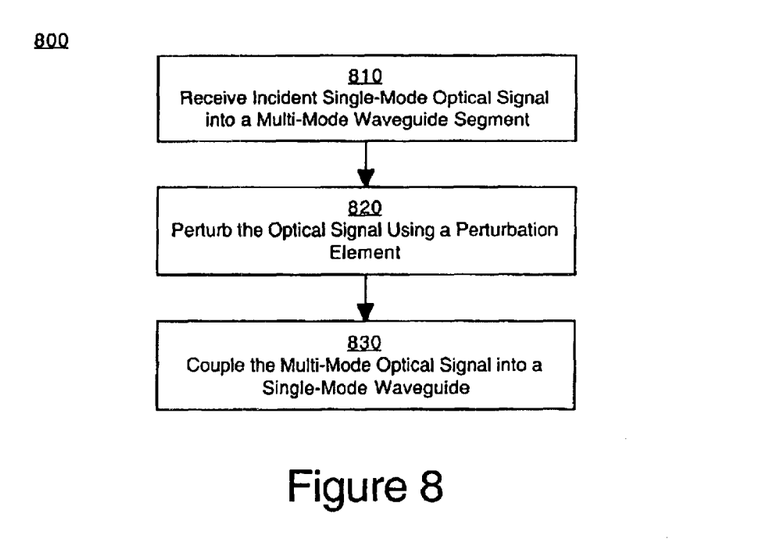
FIG. 8 is a flowchart of a method for attenuating an optical signal in accordance with one embodiment of the present invention.

FIG. 8 is a flowchart 800 of a method for attenuating an optical signal in accordance with one embodiment of the present invention. Although specific steps are disclosed in flowchart 800, such steps are exemplary. That is, embodiments of the present invention are well suited to performing various other steps or variations of the steps recited in flowchart 800. It is appreciated that the steps in flowchart 800 may be performed in an order different than presented, and that not all of the steps in flowchart 800 may be performed.

In step 810, in the present embodiment, an incident single-mode optical signal is received into a multi-mode waveguide, wherein the incident single-mode optical signal is converted to a multi-mode optical signal. In one embodiment, the multi-mode waveguide has a larger cross-sectional area than the (upstream or input) single-mode waveguide to which it is coupled.

In step 820, in the present embodiment, the multi-mode optical signal is perturbed using a perturbation element. In various embodiments, the perturbation is disposed either entirely within the multi-mode waveguide, partially inside and partially outside the multi-mode waveguide, or entirely outside the multi-mode waveguide. In one embodiment, the perturbation element has a three-dimensional refractive index that is different than the refractive index of the multi-mode waveguide.

In step 830, in the present embodiment, the multi-mode optical signal is coupled into a (downstream or output) single-mode waveguide, wherein the multi-mode optical signal is converted to an output single-mode optical signal. In one embodiment, the single-mode waveguide has a smaller cross-sectional area than the multi-mode waveguide. The single-mode output signal is attenuated (e.g., less power) relative to the incident single-mode optical signal. In one embodiment, the attenuation is achieved by exciting selected modes of the multi-mode optical signal, coupling an amount of optical power associated with the multi-mode optical signal into the selected modes, and coupling the selected modes into the single-mode waveguide. In one embodiment, by changing the refractive index, the amount of optical power coupled into the selected modes can be changed and controlled. For example, in the case of a liquid-filled trench, the index of refraction can be changed by heating the liquid.

In summary, the embodiments of the present invention utilize a perturbation in a waveguide segment for optical attenuation. In one embodiment, a single perturbation per waveguide segment is used for optical attenuation. In its various embodiments, the present invention provides an optical attenuator that can be readily integrated into planar lightwave circuits including contemporary silica-based planar lightwave circuits. The embodiments of the present invention are particularly suited for optical circuits that couple well with single-mode fibers. In addition, optical attenuators according to the various embodiments of the present invention can achieve low insertion loss (less than 0.5 dB), have a polarization dependence of less than 0.3 dB for approximately 15 dB attenuation, and have high input power tolerance (less than 25 dBm), with approximately 0.3 dB wavelength uniformity over 1300–1565 nanometers.

The present invention is thus described in various embodiments. While the present invention has been described in particular embodiments, it should be appreciated that the present invention should not be construed as limited by such embodiments, but rather construed according to the following claims.

What is claimed is:

1. An optical attenuator comprising:
   a multi-mode waveguide segment, wherein an incident single-mode optical signal is converted to a multi-mode optical signal comprising a plurality of modes; and
   a perturbation element disposed at an angle relative to said multi-mode waveguide segment, wherein said angle results in a selected amount of attenuation and a selected amount of insertion loss, said perturbation element causing perturbation of said multi-mode optical signal resulting in attenuation of said multi-mode optical signal, said perturbation element comprising a trench containing a liquid, said trench located between adjacent waveguide intersections in an optical device.

2. The optical attenuator of claim 1 wherein said multi-mode waveguide segment is coupled between an upstream single-mode waveguide segment and a downstream single-mode way guide.

3. The optical attenuator of claim 2 wherein said multi-mode waveguide segment has a larger cross-sectional area than said upstream single-mode waveguide segment and said downstream single-mode waveguide segment.

4. The optical attenuator of claim 1 wherein said liquid has an index of refraction that is variable with temperature.

5. The optical attenuator of claim 1 wherein said perturbation element is disposed completely within said multi-mode waveguide segment.

6. The optical attenuator of claim 1 wherein said perturbation element is disposed partially outside of said multi-mode waveguide segment.

7. The optical attenuator of claim 1 wherein said perturbation element is disposed completely outside of said multi-mode waveguide segment.

8. An optical circuit comprising:
   a plurality of waveguides that intersect at a first intersection and at a second intersection adjacent to said first intersection along waveguide;
   a first single-mode waveguide segment located between aid first and second intersections on said waveguide;
   a second single-mode waveguide segment located between said first and second intersections on said waveguide;
   a multi-mode waveguide segment coupling said first an second single-mode waveguide segments and adapted to receive a single-mode optical signal from said first single-mode waveguide segment, wherein said single-mode optical signal is converted to a multi-mode optical signal comprising a plurality of modes;
   a first optical switch located at said first intersection and a second optical switch located at said second intersection; and
   a perturbation element positioned to effect excitation of said multi-mode optical signal, said perturbation element comprising a trench containing a liquid, wherein said excitation causes attenuation of said multi-mode optical signal.

9. The optical circuit of claim 8 wherein said multi-mode waveguide segment has a larger cross-sectional area than said first single-mode waveguide segment and said second single-mode waveguide segment.

10. The optical circuit of claim 8 wherein said first single-mode waveguide is coupled adiabatically to said multi-mode waveguide.

11. The optical circuit of claim 8 wherein said perturbation element is disposed completely within said multi-mode waveguide segment.

12. The optical circuit of claim 8 wherein said perturbation element is disposed partially outside of said multi-mode waveguide segment.

13. The optical circuit of claim 8 wherein said perturbation element is disposed completely outside of said multi-mode waveguide segment.

14. The optical circuit of claim 8 wherein said perturbation element has an index of refraction for effecting said excitation, wherein said index of refraction is variable.

15. The optical circuit of claim 14 wherein said index of refraction varies with temperature, wherein said optical circuit further comprises:

a heater element proximate to said perturbation element and adapted to control said temperature.

16. The optical circuit of claim 8 wherein said perturbation element is positioned at an angle relative to said multi-mode waveguide segment, wherein said angle is selected to cause a certain amount of attenuation and a certain amount of insertion loss.

17. A method of attenuating an optical signal, said method comprising:

receiving an incident single-mode optical signal into a multi-mode waveguide in an optical device, wherein said incident single-mode optical signal is converted to a multi-mode optical signal comprising plurality of modes;

perturbing said multi-mode optical signal using a perturbation element having a refractive index, said perturbation element comprising a trench containing a liquid, said trench located between adjacent waveguide intersections in said optical device, wherein said perturbation element is positioned at an angle relative to said multi-mode waveguide segment, wherein said angle is selected to cause a certain amount of attenuation and a certain amount of insertion loss; and coupling said multi-mode optical signal into a single-mode waveguide, wherein said multi-mode optical signal is converted to an output single-mode optical signal, said single-mode output signal attenuated relative to said incident single-mode optical signal.

18. The method of claim 17 wherein said perturbing comprises:

exciting selected modes of said multi-mode optical signal;

coupling an amount of optical power associated with said multi-mode optical signal into said selected modes; and coupling said selected modes into said single-mode waveguide.

19. The method of claim 18 comprising:

perturbing said multi-mode optical signal using said perturbation element wherein said refractive index is changeable, wherein changing said refractive index changes said amount of optical power coupled into said selected modes.

20. The method of claim 17 comprising:

coupling said multi-mode optical signal into said single-mode waveguide, wherein said single-mode waveguide has a smaller cross-sectional area than said multi-mode waveguide.

\* \* \* \* \*